United States Patent [19]
Lu et al.

[11] Patent Number: 5,737,026
[45] Date of Patent: Apr. 7, 1998

[54] VIDEO AND DATA CO-CHANNEL COMMUNICATION SYSTEM

[75] Inventors: Daozheng Lu, Dunedin; Henry B. Wheeler, St. Petersburg; Edgar W. Aust, Palm Harbor; Robert A. Dougherty, Ozona, all of Fla.

[73] Assignee: Nielsen Media Research, Inc., New York, N.Y.

[21] Appl. No.: 482,820

[22] Filed: Jun. 7, 1995

Related U.S. Application Data

[63] Continuation-in-part of Ser. No. 395,789, Feb. 28, 1995.
[51] Int. Cl.⁶ .................................................. H04N 7/08
[52] U.S. Cl. ........................ 348/473; 348/460; 348/461
[58] Field of Search .............................. 348/473, 476, 348/477, 478, 479, 1, 2, 4, 461, 464, 467, 460; H04N 7/08, 7/84

[56] References Cited

U.S. PATENT DOCUMENTS

| | | | |
|---|---|---|---|
| 2,401,384 | 6/1946 | Young, Jr. ........................... | 348/482 |
| 2,982,813 | 5/1961 | Hathaway ........................... | 178/5.6 |
| 3,838,444 | 9/1974 | Loughlin et al. ................... | 178/5.2 |
| 3,842,196 | 10/1974 | Loughlin ........................... | 358/12 |
| 4,025,851 | 5/1977 | Haselwood et al. ................ | 325/31 |
| 4,044,376 | 8/1977 | Porter ................................ | 358/84 |
| 4,058,829 | 11/1977 | Thompson ......................... | 358/84 |
| 4,134,127 | 1/1979 | Campioni .......................... | 348/482 |
| 4,216,497 | 8/1980 | Ishman et al. ..................... | 358/84 |
| 4,388,644 | 6/1983 | Ishman et al. ..................... | 358/84 |
| 4,425,578 | 1/1984 | Haselwood et al. ................ | 358/84 |
| 4,547,804 | 10/1985 | Greenberg ......................... | 358/142 |
| 4,605,958 | 8/1986 | Machnik et al. ................... | 358/84 |
| 4,639,779 | 1/1987 | Greenberg ......................... | 358/142 |
| 4,805,020 | 2/1989 | Greenberg ......................... | 358/147 |
| 4,931,871 | 6/1990 | Kramer .............................. | 358/142 |
| 4,967,273 | 10/1990 | Greenberg ......................... | 358/142 |
| 5,243,423 | 9/1993 | DeJean et al. ..................... | 348/473 |
| 5,325,127 | 6/1994 | Dinsel ............................... | 348/473 |
| 5,327,237 | 7/1994 | Gerdes et al. ..................... | 348/476 |
| 5,386,240 | 1/1995 | Hori .................................. | 348/473 |
| 5,387,941 | 2/1995 | Montgomery et al. ............. | 348/473 |
| 5,425,100 | 6/1995 | Thomas et al. .................... | 348/1 |

FOREIGN PATENT DOCUMENTS

WO 94/10799  5/1994  WIPO ..................... H04N 7/00

*Primary Examiner*—Michael H. Lee
*Attorney, Agent, or Firm*—Marshall, O'Toole, Gerstein, Murray & Borun

[57] ABSTRACT

In the present invention, ancillary data is modulated onto a carrier frequency which is within a low energy density portion of a frequency band of a video signal, and the modulated carrier data is combined with the video signal so that the modulated carrier is in an overscan region of the video signal. The ancillary data may be spread over several frequencies and summed at the output of a decoder to enhance the legibility of the ancillary data at the output of the decoder. Frequency-stepping may be used to add the ancillary data at ones of a plurality of selected frequencies within the frequency band of the video signal. The ancillary data may be hierarchically apportioned between respective uniquely specified sequential segments corresponding to many distribution points of the video signal. This hierarchical ancillary data may be frequency-interleaved between harmonics of the horizontal sync frequency of the video signal. The ancillary data may be redundantly added above and below the roll-off frequency of a VCR.

39 Claims, 7 Drawing Sheets

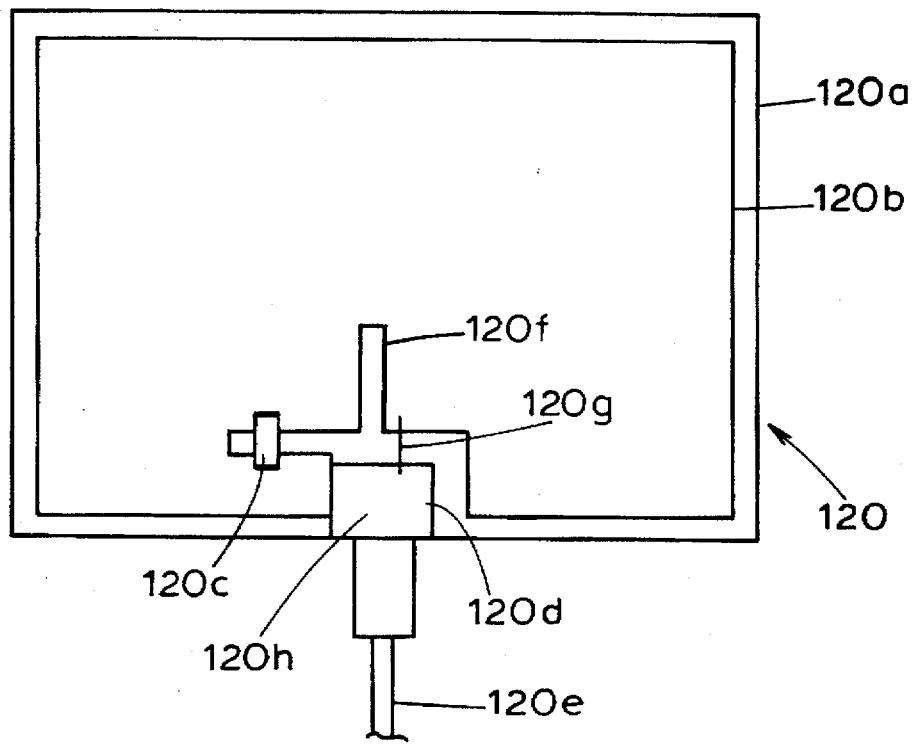
FIGURE 6
FIGURE 7
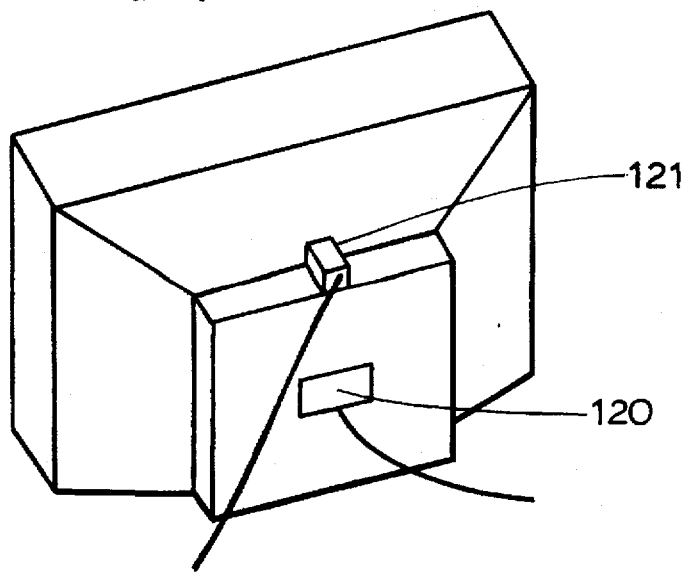

VIDEO AND DATA CO-CHANNEL COMMUNICATION SYSTEM

RELATED APPLICATION

This patent application is a continuation-in-part of U.S. patent application Ser. No. 08/395,789 which was filed on Feb. 28, 1995 and which is directed to a system and method for concurrently transmitting data with a video signal over a single communication channel so that, when the video signal is in control of a receiver, the data is imperceptible to a viewer.

FIELD OF THE INVENTION

The present invention relates to a co-channel communication apparatus and method for concurrently transmitting ancillary data with a video signal over a single communication channel so that the ancillary data is transmitted in an overscan region of the video signal and so that, when the video signal is in control of a receiver, the data is imperceptible to a viewer.

BACKGROUND OF THE INVENTION

It is known to add data in the form of ancillary signals to program signals, such as radio frequency television and/or radio program signals, for a variety of purposes. For example, ancillary signals are added to program signals in order either to monitor the broadcasts, or to measure audiences, of such programs. These programs may include television programs, radio programs, and/or the like, and the broadcast of such programs may include the transmission of these programs over the air, over a cable, via a satellite, and/or the like.

In a program monitoring system, which responds to ancillary signals in the program, the ancillary signals, which are inserted into the program signals, are in the form of identification codes which identify the corresponding broadcast programs. When monitoring the broadcast of programs, therefore, the program monitoring system senses the identification codes in order to verify that the encoded programs are broadcast. The program monitoring system also usually determines the geographical regions in which these programs are broadcast, the times at which these programs are broadcast, and the channels over which these programs are broadcast.

In a program audience measurement system which employs ancillary signals, an ancillary signal is typically added sequentially to the possible channels to which a receiver may be tuned. When the ancillary signal appears at the output of the tuner of the receiver, the channel tuned by the receiver, as well as program identification codes if any, are identified.

When an ancillary signal is added to a program signal, it must be done in such a way that the ancillary signal is imperceptible to the audience of the program. A variety of methods have been employed in attempts to attain this imperceptibility. Most of these methods can be classified into two groups, a first group in which ancillary signals are added to selected time domains within the program signal, and a second group in which ancillary signals are added to non-interfering frequency domains of the program signal.

One system of the first group, which is commonly used within the United States, is referred to as the "AMOL" system and is taught by Haselwood, et al. in U.S. Pat. No. 4,025,851. This "AMOL" system adds an ancillary signal, in the form of a digital source identification code, to selected horizontal lines in the vertical blanking intervals of selected frames of the program signal. Monitoring equipment, which is located in selected geographical regions, verify that the programs are broadcast by detecting the digital source identification codes of the broadcast programs. The monitoring equipment stores, for later retrieval, these detected source identification codes together with the times at which these source identification codes were detected and the channels on which these source identification codes were detected.

Another system of the first group is taught by Greenberg in U.S. Pat. No. 4,547,804, in U.S. Pat. No. 4,639,779, in U.S. Pat. No. 4,805,020, and in U.S. Pat. No. 4,967,273. In this system, an ancillary signal in the form of a source identification code is placed in either the vertical blanking interval or an overscan portion of the active video signal. Even though the source identification code is placed in the overscan portion of the active video signal, it is still not generally present in the horizontal lines of the video signal which control the visible part of the program and, therefore, is not normally viewed.

Still another system of the first group is taught by DeJean, et al. in U.S. Pat. No. 5,243,423. In this system, an ancillary signal is transmitted over preselected active video lines of a video raster. In order to reduce the perceptibility of the ancillary signal, the video lines over which the ancillary signal is transmitted are varied in a pseudo-random sequence. Alternatively, the ancillary signal may be modulated at relatively low modulation levels by converting the ancillary signal to a spread spectrum ancillary signal.

Still another system of the first group is taught by Thomas, et al. in U.S. patent application Ser. No. 8/279,271, which was filed on Jul. 22, 1994, which has been allowed by the United States Patent and Trademark Office, and which is a continuation of U.S. patent application Ser. No. 07/981,199 having a filing date of Nov. 25, 1992 now Pat. No. 5,425,100. In this system, a multi-level encoding system includes a plurality of encoders each of which selectively encodes information on a uniquely specified, corresponding segment of a program signal, Accordingly, the program signal is divided into a plurality of sequential code segments. The disclosure of allowed U.S. patent application Ser. No. 08/279,271 is herein incorporated by reference.

A system of the second group is taught by Hathaway in U.S. Pat. No. 2,982,813. In this system, an ancillary signal and a television program signal are frequency interleaved so that the ancillary signal is located in a region of the frequency spectrum of the television program signal which is substantially unoccupied. Because the majority of television program signal components are centered about harmonics of the horizontal line scanning rate of the television program signal, the frequency of the ancillary signal is chosen so as to be unequal to any such harmonics. Accordingly, the ancillary signal is intended to be imperceptible.

Another system of the second group is taught by Loughlin, et al. in U.S. Pat. No. 3,838,444. In this system, an ancillary signal is compatibly added and transmitted in a low energy density portion of a color television frequency spectrum. The low energy density portion of interest is located between the luminance carrier and the chrominance subcarrier of the NTSC television Signal, and is at a frequency which is about 2.4 MHz above the luminance carrier peak in the radio frequency band of the NTSC television signal. Accordingly, this system reduces the interference between the ancillary signal and the television program signal which can result from a system such as that taught by Hathaway.

Furthermore, in U.S. Pat. No. 3,842,196, Loughlin discloses an improved system which minimizes interference between a primary ancillary signal and the program signal by adding a redundant ancillary signal. The redundant ancillary signal is transmitted with an inverted polarity as compared to the primary ancillary signal so that visible artifacts, which may otherwise be caused by the addition of an ancillary signal to the program signal, are canceled because the viewer's eye averages the luminance from the primary and redundant ancillary signals.

Still another system of the second group is taught by Kramer in U.S. Pat. No. 4,931,871. In this system, a sub-audible ancillary signal is added to the program signal in a narrow bandwidth centered about 40 Hz.

Yet another system of the second group is taught by Gerdes, et al. in U.S. Pat. No. 5,327,237. In this system, an ancillary signal is rasterized at the horizontal scanning rate and is modulated onto a data carrier at a non-integral multiple of the horizontal scanning rate in order to obtain frequency interleaving of the ancillary signal and the program video signal.

Moreover, the injection of ancillary signals into a television program signal within a sampled household, which is participating in an audience measurement survey, is also well known. Signal injection systems are taught by Porter and by Thomson in U.S. Pat. No. 4,044,376 and in U.S. Pat. No. 4,058,829, respectively. In these signal injection systems, the antenna input of a sampled television receiver is switched between an antenna and the output of an RF oscillator. The frequency of the RF oscillator is stepped through the channel frequencies of each receivable television signal. Thus, an ancillary signal from the RF oscillator is injected into each channel which carries a television signal. The ancillary signal is injected during the vertical blanking interval of each receivable television signal. A probe within the television receiver determines whether the injected ancillary signal has passed through the tuner. If the injected ancillary signal has not passed through the tuner, the frequency of the injected ancillary signal is changed to a different channel and the process is repeated until the injected ancillary signal is found and the tuned channel thereby identified.

As in the case of these Porter and Thomson systems, interference between the ancillary signal and the television program signals in signal injection systems is commonly avoided by injecting the ancillary signal during the vertical blanking interval of the television program signal. In a household served by a cable system, however, an ancillary signal which is injected during the vertical blanking intervals of a television program signal may interfere with viewing on other television sets in the household that are tuned to other channels and that, therefore, have differently phased vertical sync signals.

A system taught by Machnik, et al. in U.S. Pat. No. 4,605,958 addresses this problem by looping the cable television program signals through a cable meter, through the cable converter, and back through the cable meter before these cable television program signals are passed on to the television receiver. The cable meter includes video switches which are operated to momentarily disconnect the cable television program signals from the cable converter and from the television receiver. While the cable television program signals are disconnected from the cable converter and from the television receiver, the cable meter supplies the cable converter with an injection ancillary signal at one of the frequencies to which the cable converter may be tuned. If the cable converter is tuned to that cable channel, the injection ancillary signal passes through the cable converter and returns back to the cable meter. If the cable converter is not tuned to that cable channel, the injection ancillary signal does not, therefore, pass through the cable converter and does not return back to the cable meter. Thus, by sensing when the injection ancillary signal passes through the cable converter and back to the cable meter, the cable meter is able to determine the channel to which the cable converter is tuned. Accordingly, the injection ancillary signal is prevented from reaching the television receiver and interfering with reception.

Another signal injection system is taught in published international application Pub. No. WO 94/10799 by Mostafa et al. As taught in this published patent application, a signal generator sweeps through the possible channel frequencies to which a cable converter and a VCR may be tuned. If a channel frequency has been selected by the cable converter and/or the VCR, a corresponding channel detection signal passes through the cable converter and/or VCR to thus identify the tuned channel frequency. Thereafter, an identification code at the frequency of the selected channel frequency is injected into the overscan region of the active video. This identification code includes the channel number of the selected channel frequency, the time of injection, and the serial number of the injector device. Thus, for example, the recorded channel may be determined during playback on the recording VCR, or during playback on another VCR, which is connected to the same or to a different television receiver in the metered household.

Still another signal injection system is taught in U.S. Pat. No. 4,425,578 by Haselwood, et al. In this system, the frequencies of the ancillary signals to be injected are selected so as to avoid erroneous readings. Haselwood, et al. specifically noted that ancillary signals of the type taught by Hathaway are not useful for ancillary signal injection because the amplitude of the ancillary signals must not be too large or else the ancillary signals will swamp the tuner causing interference in the viewed picture. At the same time, the amplitude of the ancillary signals must be large enough so that the ancillary signal is sufficiently above the noise inherent in the video signals to be perceived.

Yet another ancillary signal injection system is taught in U.S. Pat. No. 4,216,497 and in U.S. Pat. No. 4,388,644 by Ishman, et al. As disclosed in these patents, injection signals at the possible channel frequencies to which a receiver may be tuned are injected into a receiver until an injection signal is detected in an output of the receiver. Once the injection signal having the channel frequency to which the receiver is tuned is detected in an output of the receiver, injection signals at only that channel frequency are periodically injected into the receiver. Upon a failure to detect one of these periodically injected signals at an output of the receiver, three additional attempts are made. If all four attempts fail, a new search is made to find the new channel frequency to which the receiver is tuned.

Furthermore the use of ancillary signals which are injected into television program signals that are to be recorded on a VHS video recorder is limited because of the reduced bandwidth of the recorded signal. The VHS video recording standard allows a response roll-off above about two MHz with an offsetting boost in the higher frequency chrominance subcarrier. Thus, an ancillary signal may be recorded by a VHS recorder only if the carrier frequency of the ancillary signal is below the roll-off frequency of the VHS video recorder.

The application of digital data compression methodologies to video signals has a substantial impact on the usefulness of the ancillary signal encoding methods discussed above. Some video compression schemes delete the vertical blanking interval. Accordingly, any ancillary signals injected into the vertical blanking interval may be removed by such compression of the video signals. Digitization may also act to remove spread spectrum ancillary signals and other signals relying on low signal amplitudes for their concealment. Additionally, ancillary signals transmitted in a high frequency portion of a video signal band may be deleted by compression algorithms that 'clip' the upper frequencies.

Although adding an ancillary signal to the normally visible portion of the active video signal permits the ancillary signal to avoid removal by compression schemes in most cases, and although adding the ancillary signal at a frequency in the low energy density portion of the video signal increases the likelihood that the ancillary signal will be imperceptible even though the ancillary signal is added to the active video, under certain conditions the ancillary signal may still be perceptible. For example, if the intensity of the luminance which is modulated onto the video (i.e., luminance) carrier, or the intensity of the color which is modulated onto the chrominance subcarrier, is smaller than the ancillary signal at the time when the ancillary signal is modulated onto a frequency between the video carrier and the chrominance subcarrier, the ancillary signal will not be masked by the video carrier or the chrominance subcarrier of the video signal. Thus, the ancillary signal may have sufficient relative amplitude to be perceived as noise by the audience of the program.

The present invention overcomes one or more of the problems noted above either by modulating the ancillary signal onto a carrier having a frequency in the low energy density portion of a video signal and adding this modulated carrier to the overscan region of the video signal, or by spreading the ancillary signal over a frequency bandwidth which is greater than the frequency bandwidth of the original ancillary signal and by adding this spread ancillary signal to the overscan region of the video signal.

SUMMARY OF THE INVENTION

Therefore, a system in accordance with one aspect of the present invention transmits ancillary data in the same communication channel as a video signal. The video signal has a frequency band and an overscan region. The system includes a selecting means, a modulating means, and an adding means. The selecting means selects a carrier having a carrier frequency within a low energy density portion of the frequency band. The modulating means modulates the ancillary data onto the selected carrier to produce a modulated carrier. The adding means adds the modulated carrier to the overscan region of the video signal.

In accordance with another aspect of the present invention, a method for transmitting ancillary data in the same communication channel as a video signal, wherein the video signal has a frequency band and corner overscan regions, comprises the following steps: (i) selecting a carrier having a carrier frequency within a low energy density portion of the frequency band; (ii) modulating ancillary data onto the selected carrier to produce a modulated carrier; and (iii) adding the modulated carrier to one of the corner overscan regions of the video signal.

A system in accordance with yet another aspect of the present invention transmits ancillary data in the same communication channel as a video signal. The video signal has an overscan region, and the ancillary data has a first frequency bandwidth. The system comprises data spreading means and adding means. The data spreading means spreads the ancillary data over a second frequency bandwidth which is wider than the first frequency bandwidth. The adding means adds the spread ancillary data to the overscan region of the video signal.

BRIEF DESCRIPTION OF THE DRAWING

These and other features and advantages will become more apparent from a detailed consideration of the invention when taken in conjunction with the drawing in which:

FIG. 6 illustrates a non-intrusive sensor which may be used in connection with the present invention;

FIG. 7 illustrates the placement on a television set of the non-intrusive sensor shown in FIG. 6; and, FIG. 8 illustrates the approximate average overscan region of television sets which receive video signals containing television programs to be viewed.

DETAILED DESCRIPTION OF THE INVENTION

Figure 1:
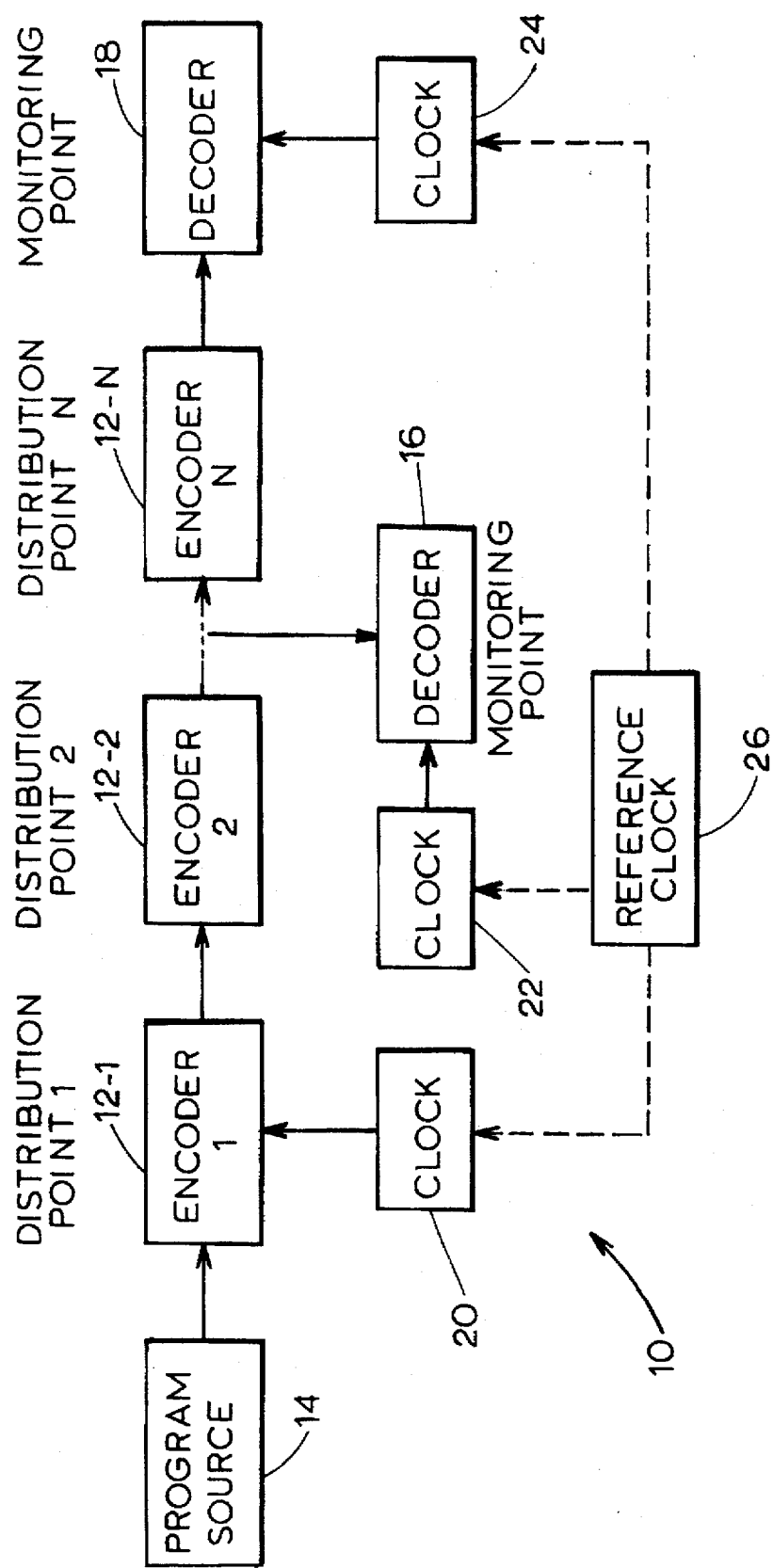
FIG. 1 is a block diagram of a multi-level encoded signal monitoring system according to the present invention.

As shown in FIG. 1, a multi-level encoded signal monitoring system 10, which may be similar to that taught by Thomas, et al. in the aforementioned U.S. patent application Ser. No. 08/279,271, includes a plurality of ancillary signal encoders 12-1, 12-2, ... 12-N. Each ancillary signal encoder 12 may be located at a corresponding stage of distribution of a program signal. The stages of distribution are designated in FIG. 1 as distribution point 1, distribution point 2, ... distribution point N. Each ancillary signal encoder 12 adds a corresponding ancillary signal code into a corresponding video segment of a program signal provided by a program source 14.

A plurality of decoders 16 and 18 are provided in association with selected points of distribution of the program signal in order to decode the ancillary signal codes which have been encoded onto the video segment by the ancillary signal encoders 12-1, 12-2, ... 12-N. The decoder 16 is associated with the distribution point 2 so that it decodes the ancillary signal codes from the video segment of the program signal at the output of the ancillary signal encoder 12-2, and the decoder 18 is associated with the distribution point N so that it decodes the ancillary signal codes from the video segment of the program signal at the output of the ancillary signal encoder 12-N. However, more or fewer decoders may be provided at these or other distribution points.

A clock 20 for providing a time-stamp is coupled to the first ancillary signal encoder 12-1. However, additional clocks, such as clocks 22 and 24, may be coupled to the other encoders and to the decoders. Such additional clocks are particularly desirable if a secondary time-stamp is to be added to the ancillary signal codes provided by the other ancillary signal encoders 12-2 ... 12-N, as may be the case when a syndicated program is initially transmitted from a central source to a plurality of local stations for rebroadcast. Furthermore, if the present invention is to be operated in a pseudo-random mode, to be described in greater detail hereinafter, a clock is required by each ancillary signal encoder 12-1, 12-2, ... 12-N and by each decoder 16 and 18, and a synchronization clock, which may be in the form of a remote reference clock 26, may be provided in order to synchronize each of the ancillary signal encoders 12-2 through 12-N and each of the decoders 16 and 18 to the ancillary signal encoder 12-1.

Figure 2:
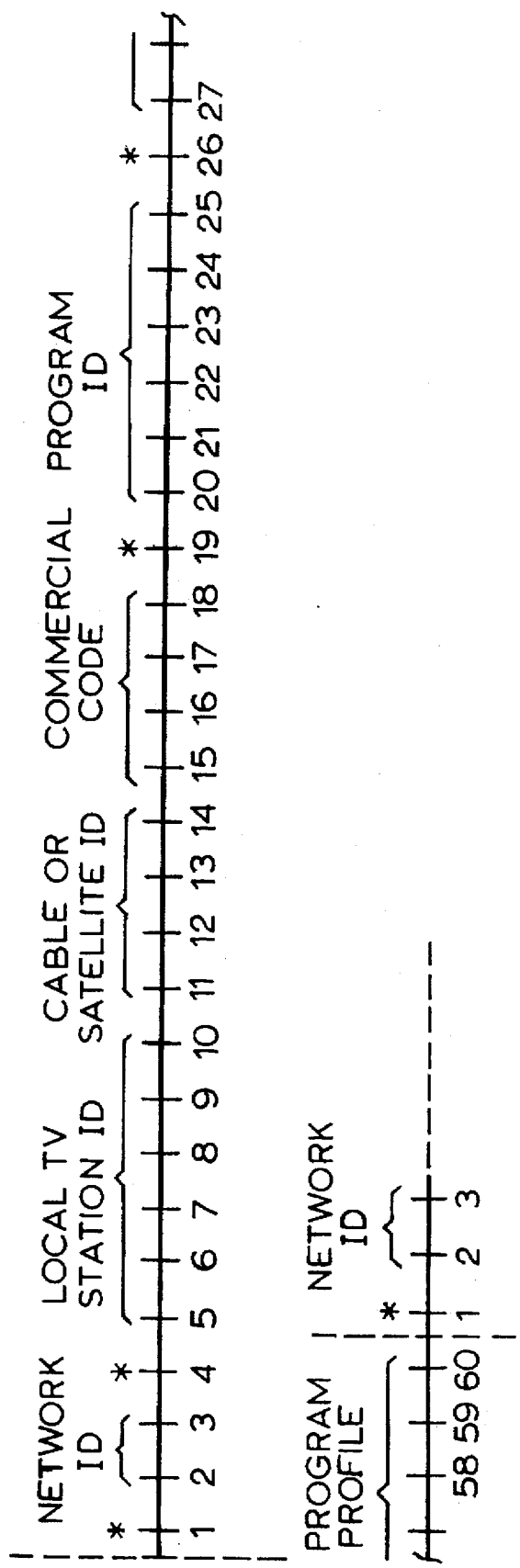
FIG. 2 is a chart illustrating a predetermined format of a universal broadcast code useful in the multi-level encoded signal monitoring system of FIG. 1.

A hierarchical ancillary signal code, which may be similar to the universal broadcast code taught by Thomas, et al. in the aforementioned U.S. patent application Ser. No. 08/279,271, includes a plurality of code segments, as shown in FIG. 2. These code segments may include a network ID, a local station ID, a cable or satellite ID, a commercial ID, a program ID, a program profile describing, for example, the content or rating of the program, and/or the like. Each such ID and profile may be encoded by a separate one of the ancillary signal encoders 12-1, 12-2, ... 12-N. Other segments, indicated by asterisks in FIG. 2, are left empty during the transmission of a television program so that these "code slots" may be employed for other purposes such as in-home television audience measurements.

Each of the segments shown in FIG. 2 may include one or more video frames of a television program signal. Thus, for example, the local TV station ID may be encoded over several video frames of the television program signal. Also, the segments shown in FIG. 2 may represent time domains of the video signal (e.g., one or more fields or frames), or the segments shown in FIG. 2 may represent frequency domains of the video signal (e.g., one or more carrier frequencies uniquely allocated to each segment). However, it should be understood that the video segments which carry ancillary signals may be other than as shown in FIG. 2.

Figure 3:
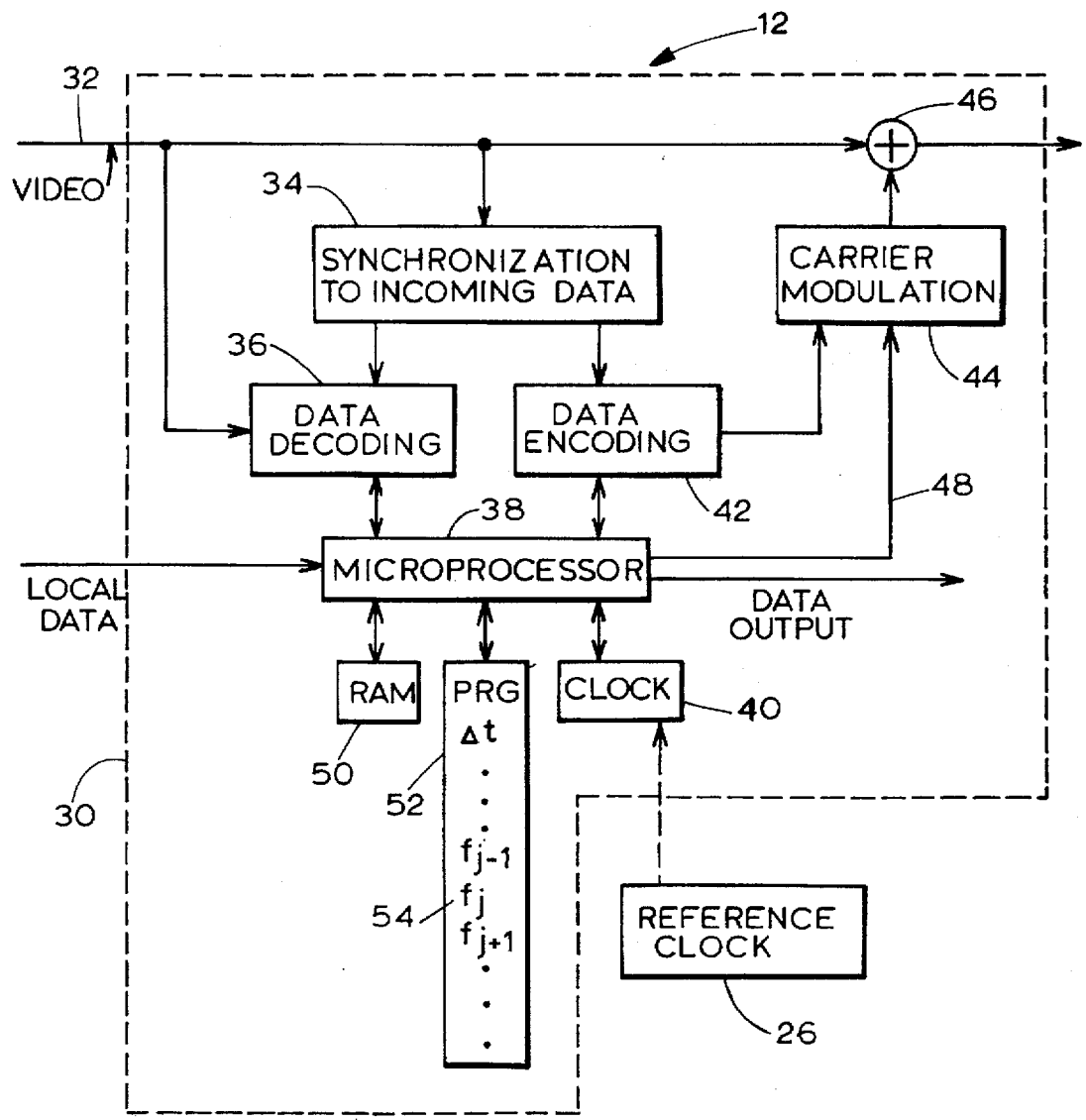
FIG. 3 is a block diagram of an encoder which may be used in the system of FIG. 1 in order to inject a frequency interleaved ancillary signal into an overscan portion of a video signal.

An ancillary signal encoder 12 is shown in more detail in FIG. 3. This ancillary signal encoder 12 may be located at an encoding site 30 in the production-distribution-viewing chain of a television broadcast program signal. The encoding site 30 receives a video signal, which is received on an input line 32 and which may be obtained as an output from an RF receiver (not shown). This video signal is applied to a synchronization block 34 for providing synchronization to the incoming data, which may include an ancillary signal code which is provided by one or more of the other ancillary signal encoders 12-1 ... 12-N and which may extend over one or more frames of the video signal. A data decoder 36 decodes the incoming data and couples the decoded incoming data to a microprocessor 38 that has associated with it a clock 40 such as the clock 22 or 24 shown in FIG. 1. In a pseudo-random embodiment of the invention, the microprocessor 38 receives synchronization information from the remote reference clock 26 in order to synchronize to the time reference of the multi-level encoded signal monitoring system 10.

The ancillary signal encoder 12 also includes a data encoder 42. The data encoder 42 receives an ancillary signal to be added to the video signal, appropriately encodes that ancillary signal, and applies the encoded ancillary signal to a carrier modulator 44. This ancillary code may be the data, such as the network ID or the local TV station ID, contained in any of the segments shown in FIG. 2 depending upon the level of distribution at which the ancillary encoder 12 is located. The carrier modulator 44, which may be controlled by the microprocessor 38 over a control line 48, modulates a carrier with the encoded ancillary signal and applies the modulated carrier to an inserter 46. The inserter 46 inserts the modulated carrier into the video signal. The ancillary signal encoder 12 also includes memory such as a RAM 50 and a ROM 52.

Figure 4:
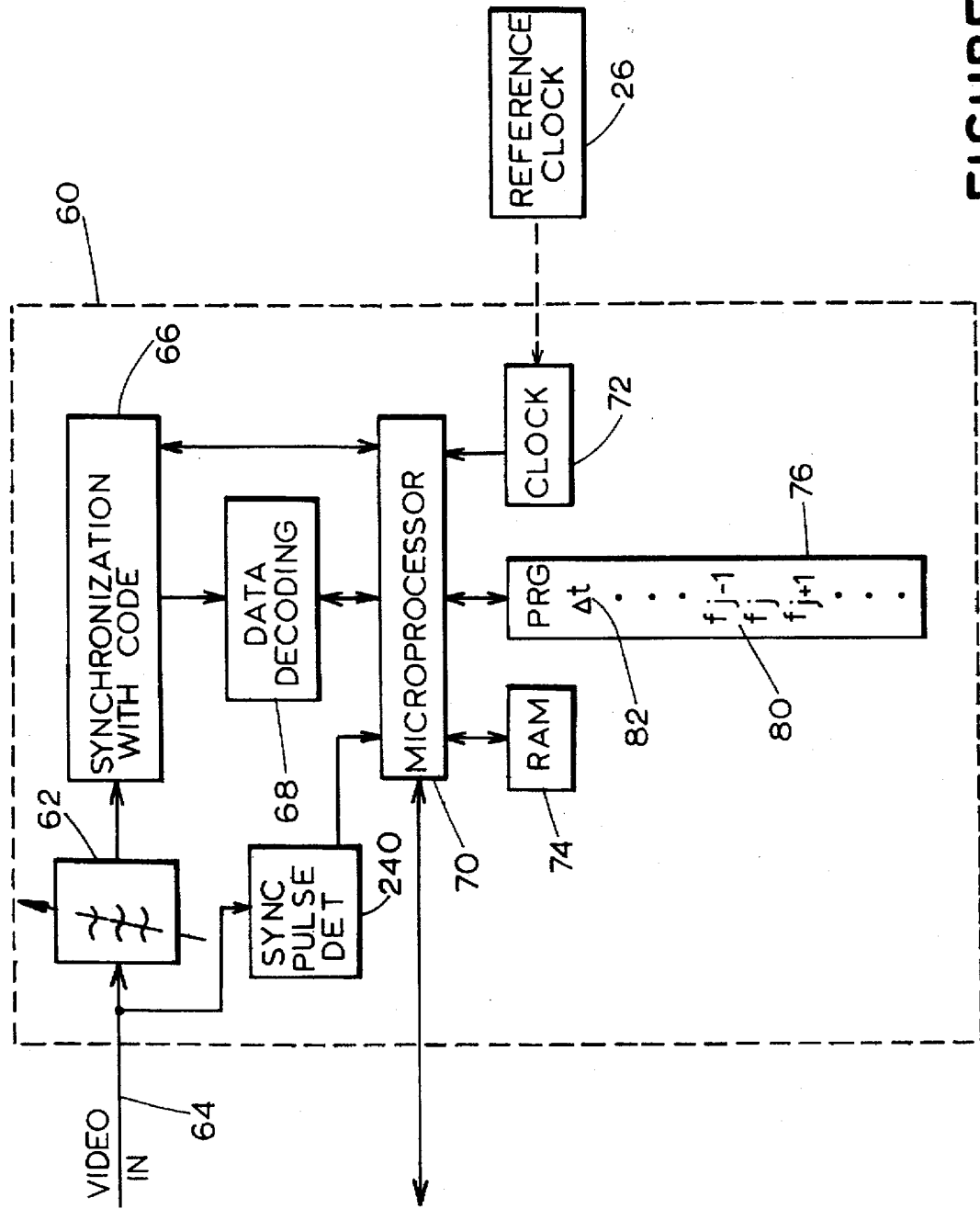
FIG. 4 is a block diagram of a decoder which may be used in the system of FIG. 1.

As shown in FIG. 4, a decoder 60, which may be used for the decoders 16 and 18, may include a tunable bandpass filter 62 and a synchronization block 66. The tunable bandpass filter 62 may be used in order to select a frequency of a video signal on a video input line 64. The synchronization block 66 may be used to provide synchronization to the incoming data as may be necessary, for example, in the event that the frequency band of the ancillary signal is spread over a wider frequency bandwidth than the frequency bandwidth of the pre-spread ancillary signal, or in the event frequency hopping is used in order to transmit the ancillary signal. The decoder 60 also includes a data decoder 68 which couples decoded incoming data to a microprocessor 70, and a clock 72 such as the clock 22 or 24 shown in FIG. 1. The clock 72 may be synchronized by the remote reference clock 26. The decoder 60 also includes a memory such as a RAM 74 and a ROM 76.

The multi-level encoded signal monitoring system 10 may be operated in several modes. For example, in one embodiment of the present invention, hereinafter referred to as the single frequency mode embodiment, the microprocessor 38 controls the data encoder 42 so that an ancillary signal is encoded by the data encoder 42, so that the encoded ancillary signal is modulated onto a carrier by the carrier modulator 44, and so that the modulated carrier is inserted by the inserter 46 into a narrow, non-interfering frequency band within the bandwidth of the video signal.

In accordance with the teachings of Hathaway, Loughlin, Gerdes, and others this ancillary signal may be in the form of a narrow-band add-on signal having a frequency which is a non-integral multiple of a harmonic of the horizontal sync frequency. Such a signal is generally non-interfering, because most of the power of the video signal is clustered at harmonics of the horizontal sync frequency. When operated in the single frequency mode, the ancillary signal encoder 12 only needs a clock 40 if a time-stamp is desired as a part of the added ID code. Moreover, in a hierarchical encoding system in which different ancillary signal encoders 12, such as the ancillary signal encoders 12-1, 12-2, ... 12-N, provide different parts of an overall ancillary signal code message, such as the ancillary signal code message shown in FIG. 2, all of the ancillary signal encoders 12 would operate with a common fixed carrier frequency. Hence, in the single frequency mode, the microprocessor 38 would not control the frequency of the carrier modulator 44 so that the control line 48 would not be necessary.

In a second mode of operation, hereinafter referred to as the fixed frequencies mode, a set of narrow-band signal addition channels, each centered about a corresponding non-interfering frequency within the bandwidth of the video signal, would be selected for use by all of the ancillary signal encoders 12-1, 12-2, ... 12-N. As is known, one may select a set of non-interfering frequencies, $f_i$, expressed as $$f_i = f_H(2m+1)/2,$$

where $f_H$ is the horizontal sync frequency, and m is an integer varying between about 110 and about 209 and between about 246 and about 266. A first low energy density portion of the bandwidth of the video signal lying below the chrominance subcarrier frequency, as taught by Loughlin, et al., corresponds to the values of the integer, m, lying between about 110 and about 209. The frequencies $f_i$ resulting from varying m between about 110 and about 209 cover a range from about 1.7 MHz to about 3.3 MHz above the base of the video band. A second low energy density portion of the bandwidth of the video signal lying above the chrominance subcarrier frequency, as taught by Gerdes et al., corresponds to the values of the integer, m, lying between about 246 and about 266. The frequencies $f_i$ resulting from varying m between about 246 and about 266 cover a range from about 3.9 MHz to about 4.2 MHz above the base of the video band.

Thus, in a fixed frequencies mode, several of the one hundred or so non-interfering frequencies may be selected, and the television signal may be encoded at each of these selected frequencies. The decoder 16 or 18 in a fixed frequencies system would acquire signals at all of the selected frequencies and sum all of these acquired signals. As is known in the communication arts, the summation of signals having both correlated and uncorrelated portions produces an improvement in the signal-to-noise ratio (SNR) of the correlated portion. For a signal in which the uncorrelated portion is random, this improvement is proportional to the square root of the number of signals summed. Therefore, if a correlated ancillary signal were placed by an ancillary signal encoder 12 in an uncorrelated co-channel video signal using four of the frequencies $f_i$, a corresponding decoder 16 or 18 that summed the four frequencies would provide twice the signal to noise ratio as a decoder 16 or 18 operating at a single fixed frequency. Thus, the fixed frequencies mode of operation of the system provides a reduction in co-channel interference by allowing the ancillary signal to be added to a video signal at a lower amplitude.

In a third mode of operation, hereinafter referred to as the "stepped frequencies" mode, a sequence of carrier frequencies, $f_j$, is selected by the ancillary signal encoder 12 (e.g., from a table 54 of such frequencies stored in the ROM 52), and sequential portions of the ancillary signal (or sequential repetitions of the ancillary signal) are added at corresponding carrier frequencies $f_j$ with a predetermined time interval $\Delta t$ (which also may be stored in the ROM 52). The sequence of selected carrier frequencies may or may not follow a simple sequential path from highest to lowest, or lowest to highest. For example, the sequence of selected carrier frequencies may follow a non-linear path between any two of preselected carrier frequencies. The order of selection of the various carrier frequencies may be chosen so as to minimize the risk of creating a fixed pattern co-channel interference with the video signal. For example, a frequency step sequence might be selected to minimize herringbone interference patterns on a monochromatic (e.g., black) screen where it would be more visible than the same interference pattern would be if displayed against a variegated background.

In the stepped frequency mode, the decoder 60 necessarily includes the tunable bandpass filter 62 in order to select the carrier frequencies $f_j$. The tunable bandpass filter 62 steps through the carrier frequencies $f_j$ under control of the microprocessor 70 in synchronism with the ancillary signal that it is reading. These carrier frequencies may be selected, for example, in accordance with a table of frequencies 80 and a predetermined time interval 82 in the ROM 76. The carrier frequencies in the table of frequencies 80 may be the same as the carrier frequencies in the table 54 of frequencies stored in the ROM 52.

Moreover, the predetermined time interval 82 may be the same as the predetermined time interval $\Delta t$ stored in the ROM 52. In order to read an ancillary signal, the microprocessor 70 initially sets the tunable bandpass filter 62 to pass the carrier frequency at which the initial block of an ancillary signal is transmitted. When the synchronization block 66 and the data decoder 68 find the beginning of an ancillary signal, the microprocessor 70 waits for the predetermined time interval 82 (i.e., the frequency stepping period) and then causes the tunable bandpass filter 62 to step to the next carrier frequency $f_j$ where data is expected to be found. When the decoder 60 is not receiving an ancillary signal, it adjusts the tunable bandpass filter 62 to pass that carrier frequency at which all ancillary signals are known to start.

The time duration of a frequency step is preferably set to be substantially longer than a horizontal sync period, or linescan time. If the carrier frequency is stepped too quickly, the stepping operation will produce additional high frequency components of the ancillary signal that may interfere with the co-channel video signal. However, this interference may be minimized by configuring the system to transmit ancillary signals only during the over-scan portion of the active video periods and to switch from one carrier frequency to another during intervening horizontal blanking intervals.

In a variation on the stepped frequency embodiment of the system of the inventions which variation is hereinafter referred to as the pseudo-random mode, the carrier frequency used by an ancillary signal encoder 12 may vary in a pseudo-random fashion in order to further minimize interference between the ancillary signal and the video signal. Pseudo-random frequency stepping, which is well known in the art of real time communication systems, generally requires that all elements of the communication system be synchronized. The television production-distribution-viewing chain commonly incorporates recording and subsequent playback at any point in the chain, and thus generates a signal that appears at some arbitrary later time. Hence, straightforward synchronization is not possible.

Synchronization may be provided, however, by the use of a single, frequency sequence initiating input (e.g., the time stamp which is recorded with the program by the initiator thereof, which may be based upon the clock 20, and which may be in the segment labelled "NETWORK ID" in FIG. 2) and by use of the remote reference clock 26 which supplies the ancillary signal encoders 12-1, 12-2, . . . 12-N and the decoders 16 and 18 with a synchronizing time value. A pseudo-random number sequence (or equivalently, a pseudo-random selection of a sequence of carrier frequencies from the set of available non-interfering carrier frequencies $f_j$) may be generated by a program which is stored in the ROMs 52 and 76 and which has the sequence initiating input as an input. That is, the sequence initiating input is used by the ancillary signal encoders 12-1, 12-2, .. . 12-N and the decoders 16 and 18, in effect, to synchronously select the pseudo-random sequence of carrier frequencies.

Accordingly, in the pseudo-random mode of the present invention, each of the ancillary signal encoders 12-1, 12-2, . . . 12-N and the decoders 16 and 18 could use the same pseudo-random number generation algorithm (e.g., which may be stored in the ROMs 52 and 76) having as an input the sequence initiating input in order to select the appropriate sequence of carrier frequencies to be used to encode and decode the ancillary code signal. The predetermined time interval $\Delta t$ as stored in the ROMs 52 and 76 is used to set the time interval between the steps of the carrier frequencies in the pseudo-random carrier frequency sequence.

The foregoing describes the means of stepping all of the elements of the multi-level encoded signal monitoring system 10 in pseudo-random synchronism, but leaves unresolved the question of how the process is to begin, i.e., how the sequence initiating input is to be discovered by a decoder. This start-up problem may be resolved by having the initial part of the ancillary signal, which includes the sequence initiating input, always broadcast at a single predetermined start-up frequency, which may preferably be a frequency found to offer a minimum value of co-channel interference. According to this method, each of the decoders 16 and 18, when not receiving code, sets its tunable bandpass filter 62 to pass the predetermined start-up carrier frequency, and waits in this status until the sequence initiating input is received. Thus, the system of the present invention provides means of minimizing co-channel interference in a system having one minimally interfering carrier frequency and a plurality of possibly more interfering but pseudo-randomly distributed carrier frequencies.

Figure 5:
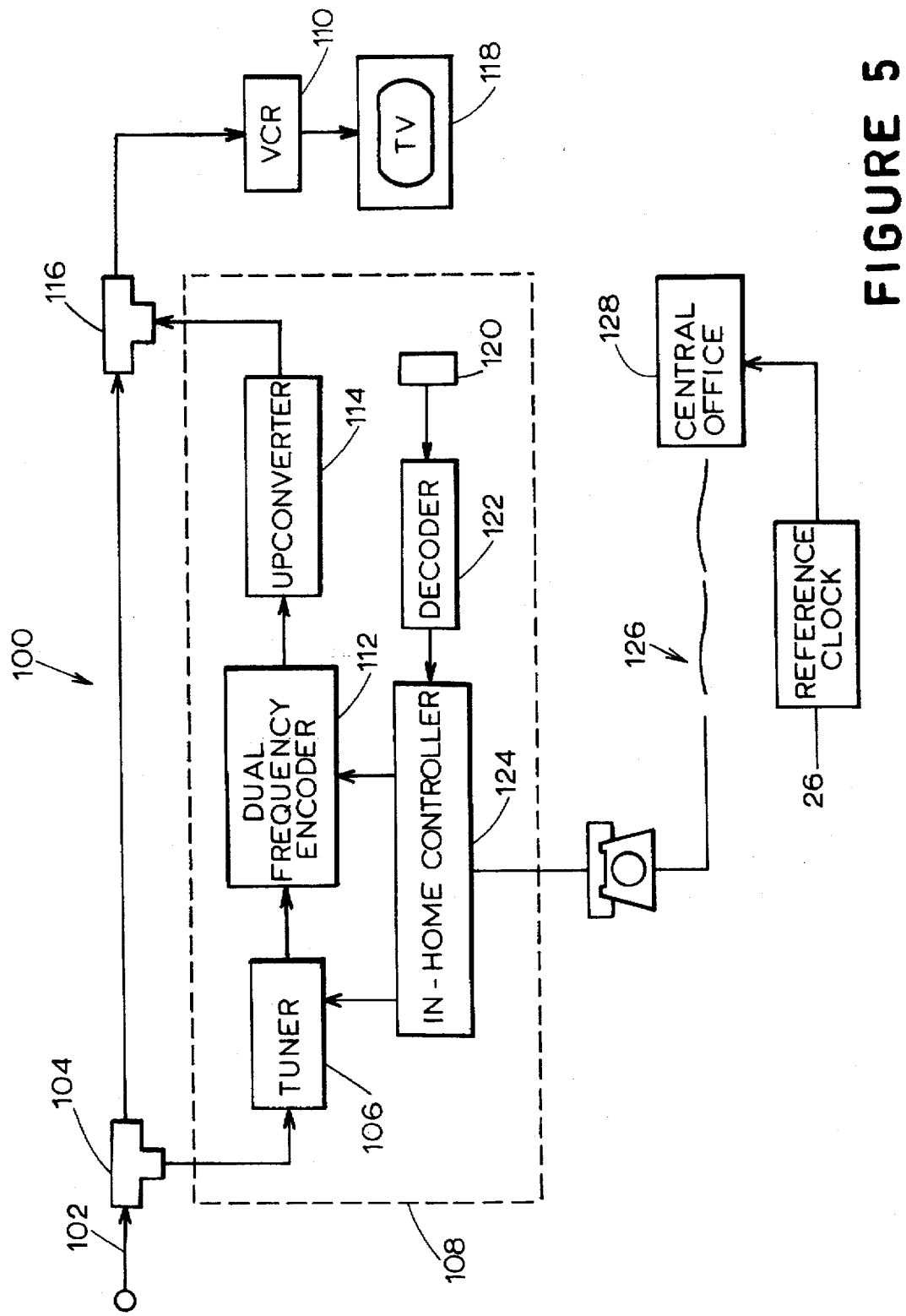
FIG. 5 is a block diagram of a non-intrusive television audience measurement system according to the present invention.

As shown in FIG. 5, an in-home television audience measurement system 100 includes a source 102 of an RF television signal. The source 102, for example, may be a television cable, an antenna, a satellite dish, and/or the like. The RF television signal is split at a splitter 104 and the channels present in the RF television signals are sequentially tuned by a tuner 106 that is part of an in-home meter 108. Any hierarchical ancillary signal which is present in the tuned signal at the output of the tuner 106 may have an in-home code (e.g., a time-stamped designation of the channel on which the ancillary signal is received) added thereto in the RF television signal In a version of the in-home meter 108 to be used in households having a VCR 110, a dual frequency encoder 112 can be used to simultaneously and redundantly add the same in-home code both at a first frequency, which lies in the low energy density portion of the frequency spectrum of the television signal and which is below the roll-off frequency of a VCR, and at a second frequency, which lies in the low energy density portion of the frequency spectrum of the television signal and which is above the roll-off frequency of the VCR. This in-home code at the first and second frequencies is added to the RF television signal by way of an upconverter 114 and a directional coupler 116, and is supplied to the VCR 110 and to an associated television 118.

Furthermore, this first frequency may instead be a group of frequencies which lie in the low energy density portion of the frequency spectrum of the television signal and which are below the roll-off frequency of a VCR. This group of frequencies may be chosen by proper selection of the integer m. Also, this second frequency may instead be a group of frequencies which lie in the low energy density portion of the frequency spectrum of the television signal and which are above the roll-off frequency of the VCR. This group of frequencies may likewise be chosen by proper selection of the integer m.

A non-intrusive sensor 120, which may be a video probe (i.e., an antenna tuned to video baseband frequencies) or an intermediate frequency antenna (e.g., tuned to the commonly used IF of 44 MHz); acquires the ancillary signal modulated carrier of the RF television signal from a position which is adjacent to the television 118. The ancillary signal, which is present in the RF television signal at the time that the RF television signal is received by the in-home television audience measurement system 100, and the in-home code, which is inserted into the RF television signal by the in-home television audience measurement system 100, are demodulated by an in-home dual-frequency decoder 122 and are stored in an in-home controller 124 for subsequent transmission by, for example, a public telephone network 126 to a data collection central office 128.

One example of the non-intrusive sensor 120 is shown in FIG. 6. The non-intrusive sensor 120 includes a support 120a, which may be in the form of a cardboard backing, a foil 120b, a terminator resistor 120c, a connector 120d, and a coaxial cable 120e. The foil 120b has a slit 120f which shapes the foil 120b in the form of a loop. The connector 120d has an inner connector 120g connected to the foil 120b on one side of the slit 120f, and an outer connector 120h connected to the foil 120b on the other side of the slit 120f. The coaxial cable 120e has inner and outer conductors connected to the corresponding inner connector 120g and the outer connector 120h. The non-intrusive sensor 120 is, therefore, configured as a tuned coil, and may be placed, as shown in FIG. 7, on the rear of a television housing so as to pick up the video signal radiated by the rear end of a television set's picture tube. If the non-intrusive sensor 120 does not adequately sense horizontal and vertical sync pulses, a magnetic pick-up 121 may be located on the television housing near the deflection coils controlling the picture tube.

VCRs of the VHS type will not record the second frequency of the in-home code because this second frequency is above the roll-off frequency of two MHz of such VCRs. Thus, if an RF television signal is viewed at the same time that it is received, the in-home dual-frequency decoder 122 will detect an in-home channel code at both frequencies, but if a signal is viewed on playback from the VCR 110, the in-home dual-frequency decoder 122 will read only the lower frequency code. Thus, the in-home television audience measurement system 100 can distinguish between time-shifted and non-time-shifted viewing in a television audience measurement.

Upon decoding of the in-home code which was added at the first and second frequencies, the in-home controller 124 may compare the in-home code associated with the second frequency to the in-home code associated with the first frequency in order to provide assurance that the in-home code was properly added and decoded.

In another embodiment of the present invention, the ancillary signal added at this first frequency may be used by an in-home metering system to determine tuning of a television, and the ancillary signal added at this second frequency may be used by a monitoring system to verify the broadcasts of television programs. Furthermore, instead of setting the first frequency below the roll-off frequency of a VCR and the second frequency above the roll-off frequency of the VCR, the first frequency may be set below the chrominance subcarrier frequency of a television signal or even below the roll-off frequency of a VCR and the second frequency may be set above the chrominance subcarrier frequency of the television signal.

Moreover, first data may be added to the television signal at a first frequency which is below the roll-off frequency of a VCR, second data may be added to the television signal at a second frequency which is above the roll-off frequency of a VCR but below the chrominance subcarrier frequency of the television signal, and third data may be added to the television signal at a third frequency which is above the chrominance subcarrier frequency of the television signal. Any one of the first, second, and third frequencies may be used for television metering and any one of the remaining frequencies may be used for program monitoring and verification. Other combinations are possible. Also, the segments of the hierarchical ancillary signal shown in FIG. 2 may be added by using these three frequencies in any combination.

Furthermore, the first data may be added by use of a first group of frequencies which lie in the low energy density portion of the frequency spectrum of the television signal and which are below the roll-off frequency of a VCR, the second data may be added by use of a second group of frequencies which lie in the low energy density portion of the frequency spectrum of the television signal, which are above the roll-off frequency of the VCR, and which are below the chrominance subcarrier, and the third data may be added by use of a third group of frequencies which lie in the low energy density portion of the frequency spectrum of the television signal and which are above the chrominance subcarrier.

Additionally, instead of associating the decoder 16 with the distribution point 2 and associating the decoder 18 with the distribution point N as shown in FIG. 1, a plurality of the decoder 16 may be located in statistically selected households where the viewing habits of a panel of viewers are being metered, and a plurality of the decoder 18 may be located in central monitoring sites of the television markets in which the broadcast of television programs are to be monitored. Accordingly, in the television viewing metering application, the decoders 16 decode the ancillary signal codes from the programs being viewed on television sets in the statistically selected households. The ancillary signal codes may be in the form of program identification codes which are inserted by the encoders 12-1, 12-2, . . . and/or 12-N into the video segments of the possible programs viewable on corresponding television sets. Accordingly, the viewing habits of the panel in the statistically selected households may be ascertained.

Moreover, in the program monitoring application, the decoders 18 decode the ancillary signal codes in the form of program identification codes which are inserted by the encoders 12-1, 12-2, . . . and/or 12-N into the video segments of selected programs. Accordingly, upon detection of a program identification code in the selected programs by a decoder 18, the broadcast of the selected programs in the market in which the decoder 18 is located may be verified.

Similarly, the decoders 16 and 18 may be used at the same time for metering the viewing habits of an audience and for monitoring the broadcast of selected programs. In this case, the program identification codes detected by the decoders 16 and 18 may be the same, or they may be inserted in different formats or at different frequencies. Furthermore, in metering the viewing habits of an audience, program identification codes may be added in the low energy density portion of the frequency spectrum of the television signal, and both below and above the roll-off frequency of a VCR. Also, each program identification code may be added by use of multiple frequencies in any one or more frequency bands.

The desirability of non-intrusive measurement methods (i.e., those that do not require even partial disassembly of the measured entertainment electronic equipment for the purpose of installing sensors) is well established in the television audience measurement art. Prior art systems employing a time-division-multiplexed code (e.g., a code written on predetermined lines of the video raster) have generally required an intrusive connection to the television (e.g., by soldering a lead to a video test point on a circuit board of the television) in order to acquire a signal that could be decoded. The system of the present invention, on the other hand, provides a non-intrusive connection because of the use of the non-intrusive sensor 120. Thus, the system of the present invention provides non-intrusive detection and decoding of both the ancillary signal, which is present in the RF television signal at the time that the RF television signal is received by the in-home television audience measurement system 100 and which is transmitted with a television signal in a co-channel mode, and the in-home code, which is inserted into the RF television signal by the in-home television audience measurement system 100.

In order to further assure imperceptibility of the ancillary signal, the ancillary signal may be added to the overscan region of the video signal. Accordingly, the ancillary signal is not only added to non-interfering frequency domains of a program's video signal (i.e., the ancillary signal is modulated onto one or more carriers in the low energy density portion of the video signal), but the ancillary signal modulated carrier is added into non-interfering time domains of the program's video signal (i.e., the ancillary signal is added to the overscan region of the video signal). Therefore, the imperceptibility of the ancillary signal is further assured when a program is viewed on a television monitor.

Figure 8:
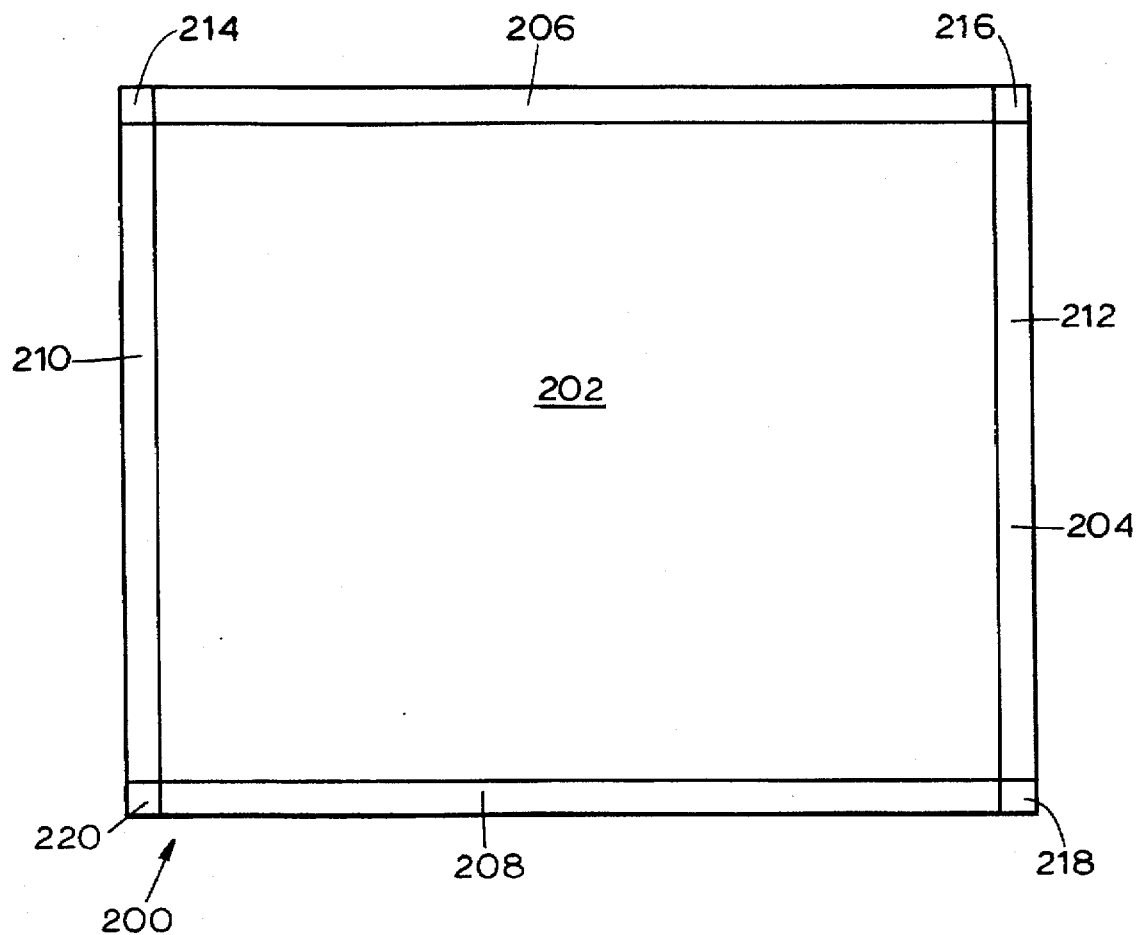

FIG. 8 generally depicts an area 200 which is occupied by the raster of one frame of a rasterized video signal as transmitted to television sets, and which includes all horizontal scan lines except those horizontal scan lines in the vertical blanking interval. The area 200, as is widely known in the television arts, includes a visible region 202 and an overscan region 204 of demonstrated average size. The visible region 202 is the region of the area 200 which is normally visible on a television monitor. The overscan region 204 is the region of the area 200 which is generally not visible on the television monitor.

Although the area 200, as shown in FIG. 8, covers a complete video frame, it should be understood that a video frame comprises two video fields. By convention, the NTSC standard for television signals requires that each frame comprise 525 horizontal scan lines. These 525 horizontal scan lines are divided into 262.5 horizontal scan lines per video field. The 262.5 horizontal scan lines of two video fields are interleaved to form a complete video frame of 525 horizontal scan lines.

Some of these 525 horizontal scan lines are generally considered to be in the vertical blanking interval. For example, horizontal scan lines 1–21 are generally considered to be in the vertical blanking interval. As noted above, signals in the vertical blanking interval may be stripped during data compression. Accordingly, if an ancillary signals is placed in the vertical blanking interval, and if the vertical blanking interval is stripped during signal compression, the ancillary signal is likely to be lost.

The overscan region 204 includes (i) those horizontal scan lines which are not in the vertical blanking interval and which are not in the visible region 202 (i.e., these horizontal scan lines are masked by the tops and bottoms of the frames of conventional television sets), and (ii) the beginnings and ends of those horizontal scan lines which are in the visible region 202 (i.e., the beginnings and ends of these horizontal scan lines are masked by the sides of the frames of conventional television sets). Thus, the mask established by the frame of a television set affects all four sides of the rasterized video signal. Accordingly, the overscan region 204 includes a top overscan subregion 206, a bottom overscan subregion 208, a left side overscan subregion 210, and a right side overscan subregion 212.

Generally, an ancillary signal added to the non-interfering time domains of a program's video signal represented by one or more of the overscan subregions 206, 208, 210, or 212 is generally invisible to the viewer of a program embodied by the program's video signal. Also, an ancillary signal added to the non-interfering frequency domains of a program's video signal represented by the low energy density portions of the video signal is also generally imperceptible to the viewer of a program embodied by the program's video signal. By adding an ancillary signal to both the non-interfering time domain and the non-interfering frequency domain of a program's video signal, confidence that the ancillary signal will be imperceptible to the viewer of the program embodied by the program's video signal is substantially increased.

This confidence can be increased even more if the ancillary signal is added to one or more corner overscan subregions 214, 216, 218, and 220. Thus, while the overscan subregions 206, 208, 210, and 212 may vary in size from television set to television set, the likelihood of the overscan subregions 206, 208, 210, and 212 varying in size in such a way as to reveal an ancillary code in one or more of the corner overscan subregions 214, 216, 218, and 220 is less likely. For example, if an ancillary code is inserted 0 into a program's video signal so that the ancillary signal is confined to the corner overscan subregion 214, both of the overscan subregions 206 and 210 must be smaller than average in order to result in the ancillary code being in the visible region 202. Therefore, the probability of an ancillary code being in the overscan region 204 of a program's video signal is increased by placing the ancillary code in one or more of the corner overscan subregions 214, 216, 218, and 220.

Accordingly, as a program's video signal is received on the input line 32 of the ancillary signal encoder 12 shown in FIG. 3, the synchronization block 34 detects the vertical and horizontal sync pulses in the incoming video signal. The data encoder 42 counts the horizontal sync pulses and is controlled by the microprocessor 38 to encode the ancillary signal and to supply the encoded ancillary signal to the carrier modulator 44 during one or more of the overscan subregions, preferably the overscan subregions 206 and 208, of the received program's video signal. The carrier modulator 44 modulates the encoded ancillary signal onto one or more carriers having frequencies in the low energy density portions of the program's video signal, and supplies the modulated carrier to the inserter 46. The inserter 46 thus inserts the modulated carrier during one or more of the overscan subregions 206 and 208 of the program's video signal.

Moreover, the received video signal may also be processed by the encoder 12 in order to determine the signal level of the video signal received at the input 32 so that the amplitude of the encoded ancillary signal modulated onto a carrier can be set by the carrier modulator 44 to a level below the signal level of the received video signal. Thus, the video signal may be used to frequency mask the ancillary signal.

Furthermore, by suitably counting the horizontal sync pulses and by resetting a clock upon the occurrence of each horizontal sync pulse, the data encoder 42 may encode the ancillary signal and supply the encoded ancillary signal to the carrier modulator 44 during one or more of the overscan subregions 210 and 212 of the received program's video signal. As before, the carrier modulator 44 modulates the encoded ancillary signal onto one or more carriers having frequencies in the low energy density portions of the program's video signal and supplies the modulated carrier to the inserter 46. The inserter 46 thus inserts the modulated carrier during one or more of the overscan subregions 210 and 212 of the program's video signal.

Also, by suitably counting the horizontal sync pulses and by resetting a clock upon the occurrence of each horizontal sync pulse, the data encoder 42 may encode the ancillary signal and supply the encoded ancillary signal to the carrier modulator 44 during one or more of the corner overscan subregions 214, 216, 218, and 220 of the received program's video signal. As before, the carrier modulator 44 modulates the encoded ancillary signal onto one or more carriers having frequencies in the low energy density portions of the program's video signal and supplies the modulated carrier to the inserter 46. The inserter 46 thus inserts the modulated carrier during one or more of the corner overscan subregions 214, 216, 218, and 220 of the program's video signal.

Accordingly, the ancillary signal may be added to the video signal during any one or more of the overscan subregions 206, 208, 210, 212, 214, 216, 218, and 220.

The ancillary signal may be modulated onto a carrier so that a "zero" data bit is modulated onto one or more first carriers and a "one" data bit is modulated onto one or more second carriers. Both the first and second carriers have corresponding frequencies in the low energy density portion of the program's video signal. Also, each bit of the ancillary signal may be added to one or more overscan regions of a field or frame so that a horizontal scan line carries a single data bit. For example, because there are about twelve lines in the top overscan subregion 206 and about twelve lines in the bottom overscan subregion 208 of the overscan region 204 of a field, a byte of data may be added per field of the video signal by adding a single data bit to each of four horizontal scan lines in the top overscan subregion 206 and a single data bit to each of four horizontal scan lines in the bottom overscan subregion 208. By repeating each byte in a number of fields (such as six fields), it is possible to increase the likelihood that the ancillary signal will survive compression.

The encoded video signal is received on the video input line 64 of the decoder 60. The video signal passes through the tunable bandpass filter 62 and the synchronization block 66 to the data decoder 68. The microprocessor 70 controls the synchronization block 66 and the tunable band-pass filter 62 in order to synchronize to the ancillary signal embedded in the video signal. For example, if the ancillary signal was transmitted using a frequency hopping algorithm, the microprocessor 70 controls the tunable band-pass filter 62 and the synchronizing block 66 in order to synchronize the decoder 60 to the incoming data. After synchronization, the data decoder 68 decodes the data and supplies the decoded data to the microprocessor 70 for storage and further processing.

Furthermore, a sync pulse detector 240 detects the vertical and horizontal sync pulses in the video signal on the video input line 64 in order to facilitate the decoding of data by the decoder 60. That is, the microprocessor 70, in response to the vertical and horizontal sync pulses, controls the tunable bandpass filter 62 and the synchronization block so that the tunable bandpass filter 62 and the synchronization block 66 synchronize to only that data which is on the horizontal scan lines in the overscan region 204 of the video signal received on the video input line 64.

Although the present invention has been described with respect to several preferred embodiments, many modifications and alterations can be made without departing from the invention. For example, instead of transmitting the sequence initiating input along with the ancillary code signal, as described above, the sequence initiating input may be stored in each encoder and in each decoder. Also, the ancillary signal may contain any type of ancillary data. For example, the ancillary data may be an identification code or an injection code. Moreover, the microprocessor 38 may be arranged to control the carrier modulator 44 over the line 48 such that the encoded ancillary data is spread over a frequency bandwidth which is wider than the frequency bandwidth of the pre-spread ancillary data. The spread ancillary data may be added to the video signal so that the spread ancillary data is in the overscan region 204 of the video signal. This ancillary data may be spread by the use of known techniques, such by as the use of frequency hopping, by the use of direct sequence spreading codes, and the like. Furthermore, the present invention may be used as a stand alone metering and/or monitoring system, or it may be used in combination with signature extraction. As taught in copending application Ser. No. 08/144,289 filed on Oct. 27, 1993, such signatures may be used when ancillary signal codes are not included in the program being metered or monitored. Signature extraction is also taught in U.S. Pat. No. 4,677,466. Additionally, the number of overscan regions may be effectively increased by increasing the number of carrier frequencies added thereto. For example, if only one carrier frequency is used in the top and bottom subregions, there are effectively only two subregions. However, if two carrier frequencies are used in the top and bottom subregions, there are effectively four subregions, if three carrier frequencies are used in the top and bottom subregions, there are effectively six subregions, and so on. A first byte of data can then be transmitted in a field using a first carrier frequency, a second byte of data can be transmitted in the same field using a second carrier frequency, a third byte of data can be transmitted in the same field using a third carrier frequency, etc. Accordingly, it is intended that all such modifications and alterations be considered as within the spirit and scope of the invention as defined in the attached claims.

We claim:

1. A system for transmitting ancillary data in the same communication channel as a video signal, wherein the video signal has a frequency band and an overscan region, the system comprising:

selecting means for selecting a carrier having a carrier frequency within a low energy density portion of the frequency band;

modulating means for modulating ancillary data onto the selected carrier to produce a modulated carrier; and, adding means for adding the modulated carrier to the overscan region of the video signal.

2. The system recited in claim 1 wherein:
   the ancillary data is first ancillary data;
   the carrier is a first carrier;
   the carrier frequency is a first carrier frequency;
   the modulated carrier is a first modulated carrier;
   the selecting means selects a second carrier having a second carrier frequency within the low energy density portion of the frequency band; and,
   the modulating means modulates the first ancillary data onto the first carrier to produce the first modulated carrier and second ancillary data onto the second carrier to produce a second modulated carrier.

3. The system recited in claim 2 wherein:
   the video signal includes at least first and second horizontal scan lines in the overscan region;
   the adding means adds the first modulated carrier to the video signal so that the first ancillary data is on the first horizontal scan line; and,
   the adding means adds the second modulated carrier to the video signal so that the second ancillary data is on the second horizontal scan line.

4. The system recited in claim 2 wherein:
   the video signal includes at least first and second horizontal scan lines in the overscan region;
   the first ancillary data is a first ancillary data bit;
   the second ancillary data is a second ancillary data bit;
   the modulating means modulates the first ancillary data bit onto the first carrier to produce the first modulated carrier and the second ancillary data bit onto the second carrier to produce the second modulated carrier;
   the adding means adds the first modulated carrier to the video signal so that the first ancillary data bit is on the first horizontal scan line; and,
   the adding means adds the second modulated carrier to the video signal so that the second ancillary data bit is on the second horizontal scan line.

5. The system recited in claim 1 wherein:
   the video signal includes at least first and second horizontal scan lines in the overscan region;
   the adding means adds the modulated carrier to the video signal such that the first horizontal scan line of the video signal carries a single ancillary data bit; and,
   the adding means adds the modulated carrier to the video signal such that the second horizontal scan line of the video signal carries a single ancillary data bit.

6. The system recited in claim 1 wherein:
   the video signal includes eight horizontal scan lines in the overscan region; and,
   the adding means adds the modulated carrier to the video signal such that each of the eight horizontal scan lines of the video signal carries a single corresponding ancillary data bit.

7. The system recited in claim 1 wherein:
   the video signal has a horizontal sync period;
   the selecting means selects the carrier having a carrier frequency within the frequency band at the beginning of each of a plurality of frequency stepping periods; and,
   each frequency stepping period has a duration equal to, or an integer multiple of, the horizontal sync period.

8. The system recited in claim 7 wherein:
   the selecting means comprises means for selecting a carrier having a plurality of carrier frequencies; and,
   each of the carrier frequencies is within the frequency band and is selected at the beginning of a corresponding one of the frequency stepping periods.

9. The system recited in claim 8 wherein:
   the video signal has a horizontal sync frequency; and,
   each of the carrier frequencies is substantially centered about a corresponding odd multiple of half the horizontal sync frequency.

10. The system recited in claim 7 wherein the video signal has a frame period, and wherein each frequency stepping period is equal to, or greater than, the frame period.

11. The system recited in claim 10 wherein:
    the video signal has a horizontal sync frequency;
    the selecting means comprises means for selecting a carrier having a plurality of carrier frequencies;
    each of the carrier frequencies is within the frequency band and is selected at the beginning of a corresponding one of the frequency stepping periods; and,
    each of the carrier frequencies is substantially centered about a corresponding odd multiple of half the horizontal sync frequency.

12. The system recited in claim 7 wherein:
    the ancillary data includes a time-varying code;
    the selecting means, the modulating means, and the adding means comprise a plurality of encoders;

a first encoder of the plurality of encoders adds a first segment of the time varying code having a first predetermined carrier frequency;

the first segment comprises a sequence initiating input;

a second encoder of the plurality of encoders comprises a clock having a current time value as an output;

the second encoder of the plurality of encoders further comprises a memory having stored therein the frequency stepping periods, a plurality of values of the carrier frequency, and a pseudo-random sequence; and, the second encoder of the plurality of encoders reads the first code segment and selects, by use of the pseudo-random sequence at the beginning of a frequency stepping period, the values of the carrier frequency.

13. The system recited in claim 1 wherein:

the selecting means selects a plurality of carriers;

each carrier has a correspondingly unique carrier frequency within the frequency band;

the modulating means redundantly modulates the ancillary data onto each of the selected carriers;

the adding means adds the redundantly modulated carriers to the video signal; and, the system further comprises demodulating means for demodulating the ancillary data from the redundantly modulated carriers.

14. The system recited in claim 13 wherein the demodulating means comprises summing means for summing the ancillary data demodulated from a first of the redundantly modulated carriers with the ancillary data demodulated from a second of the redundantly modulated carriers.

15. The system recited in claim 13 wherein the demodulating means comprises comparing means for comparing the ancillary data demodulated from a first of the redundantly modulated carriers with the ancillary data demodulated from a second of the redundantly modulated carriers.

16. The system recited in claim 15 wherein the demodulating means comprises summing means for summing the ancillary data demodulated from a first of the redundantly modulated carriers with the ancillary data demodulated from a second of the redundantly modulated carriers.

17. The system recited in claim 1 wherein:

the system is a metering and monitoring system for metering tuning of television programs in a sampled house-hold and for monitoring broadcasts of television programs;

the television programs are transmitted by way of the video signal;

the carrier is a first carrier;

the carrier frequency is a first carrier frequency;

the selecting means selects a second carrier having a second carrier frequency within the low energy density portion of the frequency band;

the modulating means modulates first ancillary data onto the first carrier and modulates second ancillary data onto the second carrier;

the first and second carrier frequencies are within the frequency band of the video signal;

the metering and monitoring system further includes metering means for metering television tuning by detecting the first ancillary data; and, the metering and monitoring system further includes monitoring means for monitoring broadcasts of television programs by detecting the second ancillary data.

18. The system recited in claim 17 wherein:

the first carrier frequency is below a roll-off frequency of a VCR; and, the second carrier frequency is above the roll-off frequency of the VCR.

19. The system recited in claim 17 wherein:

the first carrier frequency includes a first group of carrier frequencies;

the second carrier frequency includes a second group of carrier frequencies;

the first group of carrier frequencies are below a roll-off frequency of a VCR; and, the second group of carrier frequencies are above the roll-off frequency of the VCR.

20. The system recited in claim 17 wherein the video signal has a chrominance subcarrier frequency, wherein the first carrier frequency is below the chrominance subcarrier frequency, and wherein the second carrier frequency is above the chrominance subcarrier frequency.

21. The system recited in claim 17 wherein:

the selecting means selects a third carrier having a third carrier frequency within the low energy density portion of the frequency band; and, the modulating means modulates third ancillary data onto the third carrier.

22. The system recited in claim 21 wherein;

the first carrier frequency is below a roll-off frequency of a VCR;

the second carrier frequency is above the roll-off frequency of the VCR but below a chrominance subcarrier frequency of the video signal; and, the third carrier frequency is above the chrominance subcarrier frequency of the video signal.

23. The system recited in claim 21 wherein:

the first carrier frequency includes a first group of carrier frequencies;

the second carrier frequency includes a second group of carrier frequencies;

the third carrier frequency includes a third group of carrier frequencies;

the first group of carrier frequencies are below a roll-off frequency of a VCR;

the second group of carrier frequencies are above the roll-off frequency of a VCR but below a chrominance subcarrier frequency of the video signal; and, the third group of carrier frequencies are above the chrominance subcarrier frequency of the video signal.

24. The system recited in claim 1 wherein:

the ancillary data includes a time-varying ancillary code;

the modulating means is located within a sampled household and modulates the time-varying ancillary code onto the carrier;

the system further includes non-intrusive acquiring means adjacent a display of the video signal for non-intrusively acquiring the modulated carrier; and, the system further includes demodulating means for demodulating the time-varying ancillary data from the modulated carrier.

25. The system recited in claim 24 wherein the non-intrusive acquiring means comprises a video probe.

26. The system recited in claim 25 wherein video probe comprises a foil tuned pickup located near the rear end of a picture tube.

27. The system recited in claim 24 wherein the non-intrusive acquiring means comprise an intermediate frequency probe.

28. The system recited in claim 24 wherein the broadcast television signal comprises a co-channel transmitted time-varying ancillary data signal.

29. A method for transmitting ancillary data in the same communication channel as a video signal, wherein the video signal has a frequency band and corner overscan regions, the method comprising the steps of:

selecting a carrier having a carrier frequency within a low energy density portion of the frequency band;

modulating ancillary data onto the selected carrier to produce a modulated carrier; and, adding the modulated carrier to one of the corner overscan regions of the video signal.

30. The method recited in claim 29 wherein:

the ancillary data is first ancillary data;

the carrier is a first carrier;

the carrier frequency is a first carrier frequency;

the modulated carrier is a first modulated carrier;

the step of selecting a carrier comprises the step of selecting a second carrier having a second carrier frequency within the low energy density portion of the frequency band; and, the step of modulating the ancillary data comprises the steps of modulating the first ancillary data onto the first carrier to produce the first modulated carrier and modulating second ancillary data onto the second carrier to produce a second modulated carrier.

31. The method recited in claim 30 wherein:

the video signal includes at least first and second horizontal scan lines in the corner overscan regions; and, the adding step comprises the steps of adding the first modulated carrier to the video signal so that the first ancillary data is on the first horizontal scan line and adding the second modulated carrier to the video signal so that the second ancillary data is on the second horizontal scan line.

32. The method recited in claim 30 wherein:

the video signal includes at least first and second horizontal scan lines in the overscan region;

the first ancillary data is a first ancillary data bit;

the second ancillary data is a second ancillary data bit; and, the step of modulating the ancillary data comprises the steps of modulating the first ancillary data bit onto the first carrier to produce the first modulated carrier and modulating the second ancillary data bit onto the second carrier to produce the second modulated carrier;

the adding step comprises the steps of (i) adding the first modulated carrier to the video signal so that the first ancillary data bit is on the first horizontal scan line, and (ii) adding the second modulated carrier to the video signal so that the second ancillary data bit is on the second horizontal scan line.

33. The method recited in claim 29 wherein:

the video signal includes at least first and second horizontal scan lines in the corner overscan regions; and, the adding step comprises the steps of adding the modulated carrier to the video signal such that the first horizontal scan line of the video signal carries a single corresponding ancillary data bit and adding the modulated carrier to the video signal such that the second horizontal scan line of the video signal carries a single corresponding ancillary data bit.

34. The method recited in claim 29 wherein:

the video signal includes eight horizontal scan lines in the corner overscan regions; and, the adding step comprises the step of adding the modulated carrier to the video signal such that each of the eight horizontal scan lines of the video signal carries a single corresponding ancillary data bit.

35. The method recited in claim 29 wherein:

the ancillary data includes a plurality of hierarchical ancillary codes to be added to the video signal;

each hierarchical ancillary code comprises a time datum and a location datum;

each location datum is uniquely associated with one of a plurality of encoders;

each encoder has uniquely associated therewith a corresponding one of a plurality of carrier frequencies;

each carrier frequency of the plurality of carrier frequencies is in the frequency band;

the step of modulating the ancillary data comprises the step of modulating each hierarchical ancillary code onto a carrier having a corresponding one of the plurality of carrier frequencies; and, the step of adding the modulated ancillary data to the video signal comprises the step of adding each modulated carrier frequency to the video signal.

36. The method recited in claim 35 wherein:

the video signal has a horizonal sync frequency associated therewith; and, each carrier frequency of the plurality of carrier frequencies is substantially centered about an odd multiple of half the horizontal sync frequency.

37. The system recited in claim 1 wherein:

the overscan region comprises n overscan regions;

n is an integer; and, n is effectively increased by a number of carrier frequencies added to the n overscan regions.

38. The system recited in claim 37 wherein n=1.

39. The system recited in claim 37 wherein n>1.

* * * * *